(12) United States Patent
Koper et al.

(10) Patent No.: US 11,057,227 B2
(45) Date of Patent: Jul. 6, 2021

(54) NETWORK MANAGEMENT USING WAKE ON LAN

(71) Applicant: Microsemi P.O.E Ltd., Hod Hasharon (IL)

(72) Inventors: Ezra Koper, Gan-Yavne (IL); Nadav Gleit, Kadima Zoran (IL)

(73) Assignee: Microsemi P.O.E Ltd., Hod Hasharon (IL)

( * ) Notice: Subject to any disclaimer, the term of this patent is extended or adjusted under 35 U.S.C. 154(b) by 68 days.

(21) Appl. No.: 16/181,578

(22) Filed: Nov. 6, 2018

(65) Prior Publication Data
US 2020/0106627 A1 Apr. 2, 2020

Related U.S. Application Data

(60) Provisional application No. 62/740,151, filed on Oct. 2, 2018.

(51) Int. Cl.
*H04L 12/12* (2006.01)
(52) U.S. Cl.
CPC .................................. *H04L 12/12* (2013.01)
(58) Field of Classification Search
CPC .......... H04L 12/12; H04L 41/04; Y02D 30/50
USPC ........................................................ 709/223
See application file for complete search history.

(56) References Cited

U.S. PATENT DOCUMENTS

| 2003/0121032 A1 | 6/2003 | Cho et al. |
| 2012/0311650 A1 | 12/2012 | Kito |
| 2013/0308642 A1* | 11/2013 | Kimura ................ G06F 1/3278 370/392 |

OTHER PUBLICATIONS

PCT/IL2019/050864, International Search Report and Written Opinion of the International Search Authority, dated Jan. 2, 2020.
PCT/IL2019/050864, Invitation to Pay Additional Fees, dated Oct. 9, 2019.
"DP83822 Robust, Low Power 10/100 Mbps Ethernet Physical Layer Transceiver", Data Sheet, Texas Instruments, SNLS505C—Aug. 2016, Revised Apr. 2018.
Ross, "DP83822 Wake-On-LAN", Application Report, Texas Instruments Incorporated, SNLA261, Aug. 2016.

* cited by examiner

*Primary Examiner* — Tu T Nguyen
(74) *Attorney, Agent, or Firm* — Glass and Associates; Kenneth D'Alessandro; Kenneth Glass

(57) ABSTRACT

In a network including a controllable device, a method for sending a network management method to the controllable device including asserting a network management command directed to the controllable device and in response to the network management command generating and sending over the network a first number of WOL packets having a predetermined relationship to one another, followed by generating and sending over the network a second number of WOL packets, a predetermined relationship between the second number of WOL packets defining the network management command.

16 Claims, 4 Drawing Sheets

NETWORK MANAGEMENT USING WAKE ON LAN

BACKGROUND

The present invention relates to network management. More particularly, the present invention relates to employing a Wake on LAN (WOL) feature supported by many Ethernet Switch or PHY integrated circuits (ICs) to provide a simple low-cost network management signaling from a host device to a network device.

It is problematic from a product cost perspective to add network management capability to low cost network devices using prior art methods, since it requires employing a processor having a media access control (MAC) interface with a media independent interface (MII) or reduced media independent interface (RMII), and also requires the processor to run a TCP/IP, or other equivalent, software stack. Running a TCP/IP software stack requires at least around 512 KB of FLASH memory and around at least 128 KB of RAM memory. Such processor requirements together with the long development cycle needed to combine the TCP/IP network features into a reliable working software package also contribute to product overall cost.

Many Ethernet switch, and physical layer (PHY) integrated circuits support WOL, meaning that such integrated circuits can detect a specific Ethernet broadcast network message packet (i.e. a WOL packet) directed to a specific device (based on the device MAC address) and assert a signal on an output pin and/or set an internal register indicative that such packet was received. WOL is typically implemented using a specially designed frame called a magic packet, which is broadcast to all devices on a network, or a subnetwork, among them the device to be awakened. The magic packet contains an address of the device to be awakened (typically as the MAC address). A number of WOL frames are known, including Magic Packet, Magic Packet with Secure-On and Custom pattern Match.

The integrated circuit (IC) may thus have a dedicated WOL output pin and/or internal registers to manage the functionality of WOL. In other cases, the switch/PHY IC may have a more general IRQ interrupt output pin used to signal to a connected processor the occurrence of various events, one of the events being reception of the WOL packet. When a WOL packet is received by the switch/PHY IC, the switch/PHY will either signal this event by asserting a signal on a dedicated WOL pin, or by asserting a general interrupt, and/or indicate this event in one or more of its switch registers. In prior-art systems, a processor receives the asserted signal output on the WOL or IRQ pin, and acts to clear the interrupt by accessing the switch/PHY registers over an SPI connection or an I²C bus. In some embodiments, the WOL interrupt may be a pulse and access to the registers may not be required. The processor typically configures the switch/PHY IC with a predetermined MAC address for intercepting a WOL packet over the LAN that is directed to the specific device.

Control of an unmanaged power over internet (PoE) injector for a pan-tilt-zoom (PTZ) Ethernet camera is an instructive example that illustrates the problems posed by the prior art and addressed by the present embodiments.

Many times, access to the camera is difficult and/or inconvenient since cameras may be located at the top of tall poles or in other locations where access is inconvenient. In the event that it is necessary to reset the camera powered by the PoE injector, for example when the camera has functionally locked up, the PoE injector would thus need to be powered off, which requires the user to manually locate the power source of the PoE injector, disconnect the PoE injector from its power source, and then reconnect the PoE injector to its power source, so as to power the camera off and then back on. Often, access to the local network to which the camera is connected is considerably easier than accessing either the camera or the PoE injector power source. Unfortunately, the prior art does not provide a simple low-cost solution to allow for resetting devices connected to a PoE injector which is not provided with an Ethernet TCP/IP software stack.

BRIEF DESCRIPTION

According to one aspect of the present invention, one or more WOL packets received by an Ethernet switch or PHY are defined as a management command for controlling a controllable device connected to the network through the Ethernet switch or PHY. A number of different management commands are defined by one or more attributes of the one or more WOL packets, including but not limited to the number of WOL packets or groups of WOL packets, and the timing between successive WOL packets or groups of WOL packets. A processor is coupled to an output of the Ethernet switch or PHY that generates signals indicating arrival of each of the WOL packets at the Ethernet switch or PHY. The signal generated by the Ethernet switch or PHY indicating arrival of each of the WOL packets at the Ethernet switch or PHY can be an interrupt or logic level written into an externally readable register. The processor decodes the signals into one of the number of different management commands and outputs a signal to implement the decoded one of the management commands.

According to one aspect of the present invention, multiple management commands are each defined by a predefined protocol in the form of one or more WOL packets to be sent in various pre-defined time intervals (like Morse code signaling). In one embodiment, the number of WOL packets received by the Ethernet switch within a defined time window and/or the time interval(s) between a group of successive received WOL packets are assigned meanings that alone or in combination define a number of different management commands. The processor coupled to the WOL output of the Ethernet switch analyzes these timing attributes of the received WOL packets and decodes them as one of the multiple management commands sent over the LAN. Several non-limiting examples of management commands include, without limitation, PoE On/Off, Enable/Disable small form factor pluggable (SFP) port vs. RJ45 Ethernet port, and change the power level that the injector provides to a connected device receiving PoE.

As noted above, limited uni-directional host to device management signaling can be achieved by using "Morse code" style signaling, i.e. the host will send WOL Ethernet packets with various strict time intervals or number of WOL packets per time window thus defining the specific management command For example, one code may indicate PoE off, while another may indicate PoE on. One code may indicate setting the media data in port to the RJ-45 jack, and another code may indicate to set the media data in port to the SFP (small form-factor pluggable) data uplink.

In accordance with the present invention, in a network including a controllable device, a method for implementing network management to the controllable device includes asserting a network management command directed to the controllable device, in response to the network management command generating and sending over the network a first number of WOL packets having a predetermined relationship to one another, followed by generating and sending over the network a second number of WOL packets, a predetermined relationship between the second number of WOL packets defining the network management command In accordance with an aspect of the present invention the predetermined relationship between the first number of WOL packets is a predetermined timing of the sending of the first number of WOL packets with respect to one another, and the predetermined relationship between the second number of WOL packets is a predetermined timing of the sending of each of the second number of WOL packets with respect to one another.

In accordance with an aspect of the present invention the predetermined timing of the sending of the first number of WOL packets with respect to one another comprises a fixed time interval between the sending of each of the first number of WOL packets.

In accordance with an aspect of the present invention the predetermined timing of the sending of the second number of WOL packets with respect to one another includes a first fixed time interval between the sending of each of the second number of WOL packets to define a first network management command, and a second fixed time interval between the sending of each of the second number of WOL packets to define a second network management command different from the first network management command In accordance with an aspect of the present invention a method for controlling a controllable device over a network includes asserting a network management command directed to the controllable device, in response to the network management command generating and sending over the network a first number of WOL packets in a predetermined time sequence, followed by generating and sending over the network a second number of WOL packets, a timing of the sending of each of the second number of WOL packets with respect to one another defining the network management command, receiving in an internet switch on the network the first and second numbers of WOL packets and setting the state of a WOL packet signal in the internet switch in response to arrival of each of the first and second numbers of WOL packets, transmitting timing of the set state of each WOL packet signal to a processor over one of a I2C and an SPI bus, and then resetting the state of the WOL packet signal, generating in the CPU from the timing of the set states of each WOL packet signal to a device management command, asserting the device management command from the CPU to the controllable device.

BRIEF DESCRIPTION OF THE DRAWING FIGURES

The invention will be explained in more detail in the following with reference to embodiments and to the drawing in which are shown:

DETAILED DESCRIPTION

Persons of ordinary skill in the art will realize that the following description is illustrative only and not in any way limiting. Other embodiments will readily suggest themselves to such skilled persons.

In accordance with the present embodiments, WOL detection can be processed by a switch or PHY, and limited network management is provided by a processor in communication with the switch or PHY, without requiring the processor to include a MAC controller or TCP/IP or other software communication protocol stack. Thus, a low-cost processor, such as a low-cost microcontroller supporting serial or parallel communication, including, but not limited to I$^2$C, and SPI, may be utilized. The processor monitors an externally-accessible wake-on-LAN indicator in the switch or PHY which may be in the form of an internal register, an output pin assigned for WOL or a general interrupt report and, if necessary, clears the event by accessing the switch or PHY internal registers using typically the appropriate communications protocols.

The cost of a management processor can be dramatically reduced if a processor without an Ethernet bus and TCP/IP software stack would be sufficient. Microcontrollers running at low clock frequency with around 16 KB of internal FLASH memory including an interface such as SPI or I$^2$C and that do not include a MAC controller cost around 20-30 cent in high volumes.

To achieve such a low-cost management capability, embodiments herein shift the detection and processing of network management packets from the processor to the switch, or PHY, by using WOL packet detection. The switch/PHY IC is preferably provided a unique ID so that in case several similar devices are connected on the same LAN, only the specific target device will respond to the management commands. Such unique ID is usually obtained by using a dedicated 48-bit MAC address for each switch.

Figure 1:
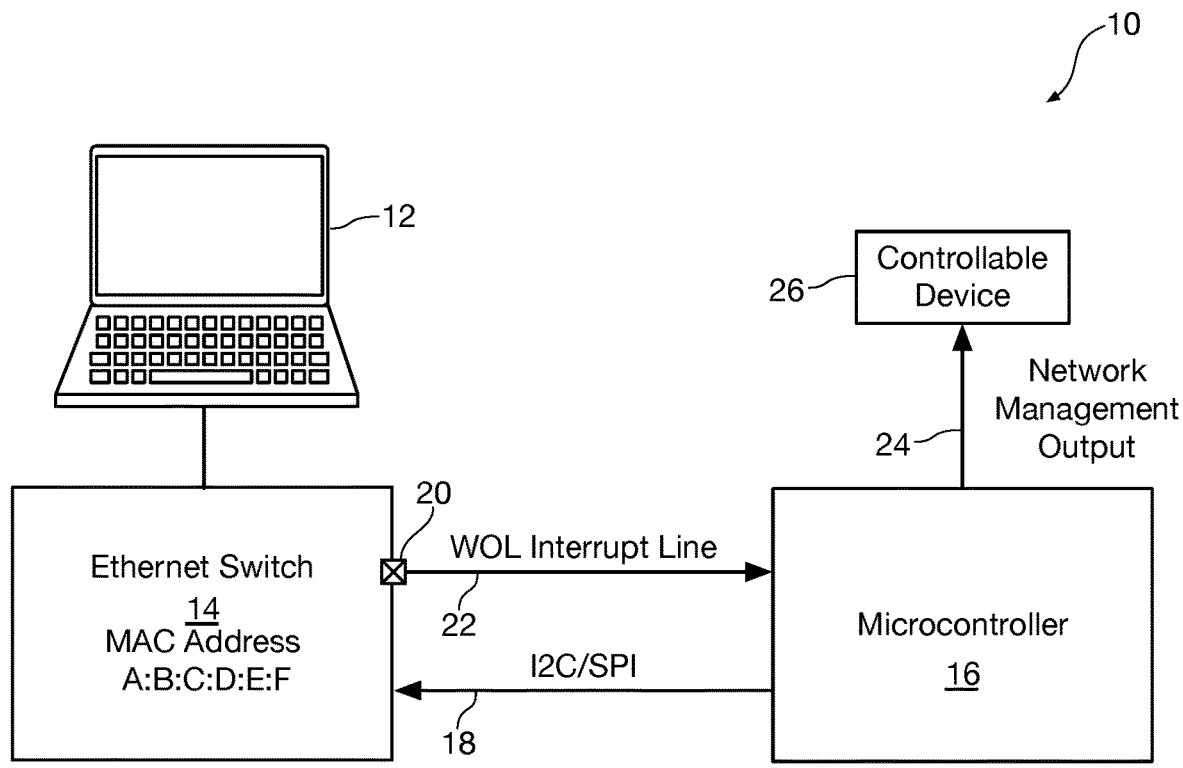
FIG. 1 is a block diagram of a network system allowing network management in accordance with the present invention.

Referring now to FIG. 1, a block diagram shows a network system 10 allowing network management in accordance with the present invention. The network system 10 includes a device such as a personal computer 12 connected to an Ethernet switch 14. The Ethernet switch 14 supports WOL. An illustrative example of such an Ethernet switch 14 is a KSZ9897S gigabit Ethernet switch available from Microchip of Chandler Ariz.

A processor, illustrated as microcontroller 16, is coupled to the Ethernet switch 14 over a connection 18, such as an SPI connection, or an I$^2$C bus. A WOL interrupt pin 20 is coupled to an interrupt input on the microcontroller 16 over an interrupt line 22. The microcontroller 16 drives a network management output line 24. The output management line 24 is connected to a controllable Ethernet device 26, an aspect of which can be controlled by a management command A non-limiting example of such a controllable Ethernet device 26 is a PoE PTZ camera, the power to which can be controlled by on/off management commands. As noted other exemplary commands include, without limitation, enabling and disabling and switching between small form factor pluggable (SFP) ports and RJ45 Ethernet ports, changing the power level that a PoE injector provides to a connected controllable Ethernet device.

In accordance with the present invention, a network management event is initiated by the user device 12 in response to a request for the management event. The request for the management event may be in the form of input from a user or could be automatically generated in response to triggering event such as a timer or other alarm. The user device 12 sends a command defining a network management event in the form of one or more WOL packets to the Ethernet switch 14. The Ethernet switch 14 supports WOL, meaning that it can detect a specific Ethernet packet addressed to a specific device (based on the MAC address of the device) and indicate receipt of the packet by asserting an interrupt signal on WOL interrupt pin 20 and/or setting an internal register. In the example of FIG. 1, the WOL packets indicate the MAC address of the Ethernet switch 14 (shown symbolically as A:B:C:D:E:F). When the WOL packets addressed to the Ethernet switch 14 are received, the Ethernet switch 14 in FIG. 1 asserts an interrupt signal on its WOL interrupt pin 20. This interrupt signal, which can be referred to as a WOL packet signal, is communicated to the microcontroller 16 over WOL interrupt line 20. After the microcontroller 16 receives the interrupt signal on line 20 it clears the WOL signal on the WOL interrupt pin by clearing the appropriate register by communication over connection 18.

Figure 2:
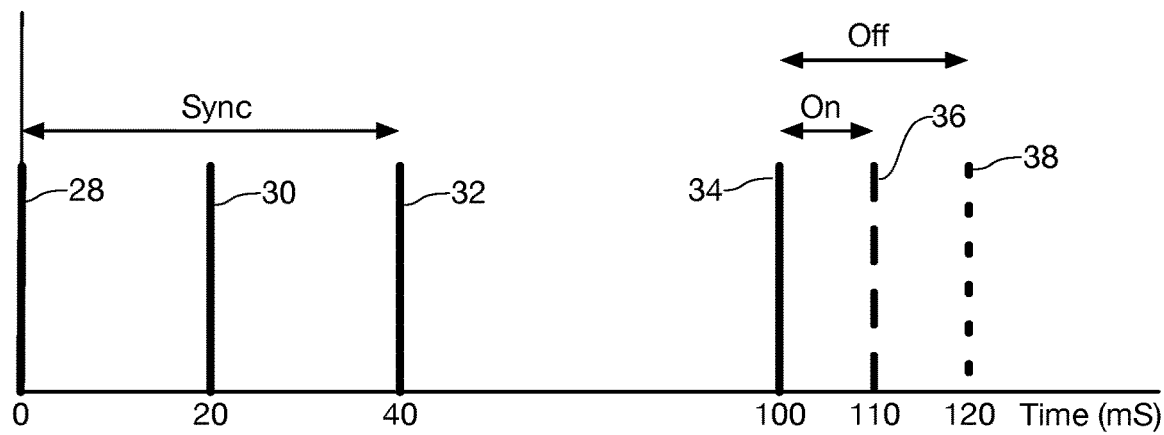
FIG. 2 is an example of a timing chart illustrating the use of WOL to implement network management in accordance with an aspect of the invention.

Referring now to FIG. 2, a timing chart shows an illustrative use of WOL to implement network management in accordance with an aspect of the invention. In the illustrative embodiment shown in FIG. 2, a first group of WOL interrupt signals shown symbolically at reference numerals 28, 30, and 32. are received by the microcontroller. The WOL interrupt signals 28, 30, and 32 are examined by the microcontroller 16 and, in the example shown in FIG. 2, are determined to be separated by a first predetermined interval, herein illustrated as 20 mS, indicating a synchronization event that announces that a network management command is going to be received.

In the example the synchronization event is followed at a known second interval by a second group of one or more additional WOL interrupt signals. In the example shown in FIG. 2, the second group of WOL interrupt signals include third, fourth and fifth possible WOL interrupt signals 34, 36, and 38. As shown in FIG. 2, where the network management event is shown as a turn-on or turn-off event, a first WOL interrupt signal 34 in the second group is followed by either a second WOL interrupt signal 36 in the second group, shown in dashed lines, at a first predetermined time following the first WOL interrupt signal 34 in the second group or a third interrupt signal 38 in the second group, shown in dotted lines, at a second predetermined time following the first interrupt signal 34 in the second group. The second predetermined time is longer than the first predetermined time.

In the illustrative embodiment shown in FIG. 2, if the first and second WOL interrupt signals are received, an "on" event is specified. If the first and third WOL interrupt signals are received, an "off" event is specified. Persons of ordinary skill in the art will appreciate that other combinations of timing differences or numbers of interrupt signals may be employed to define different network management events.

Figure 3A:
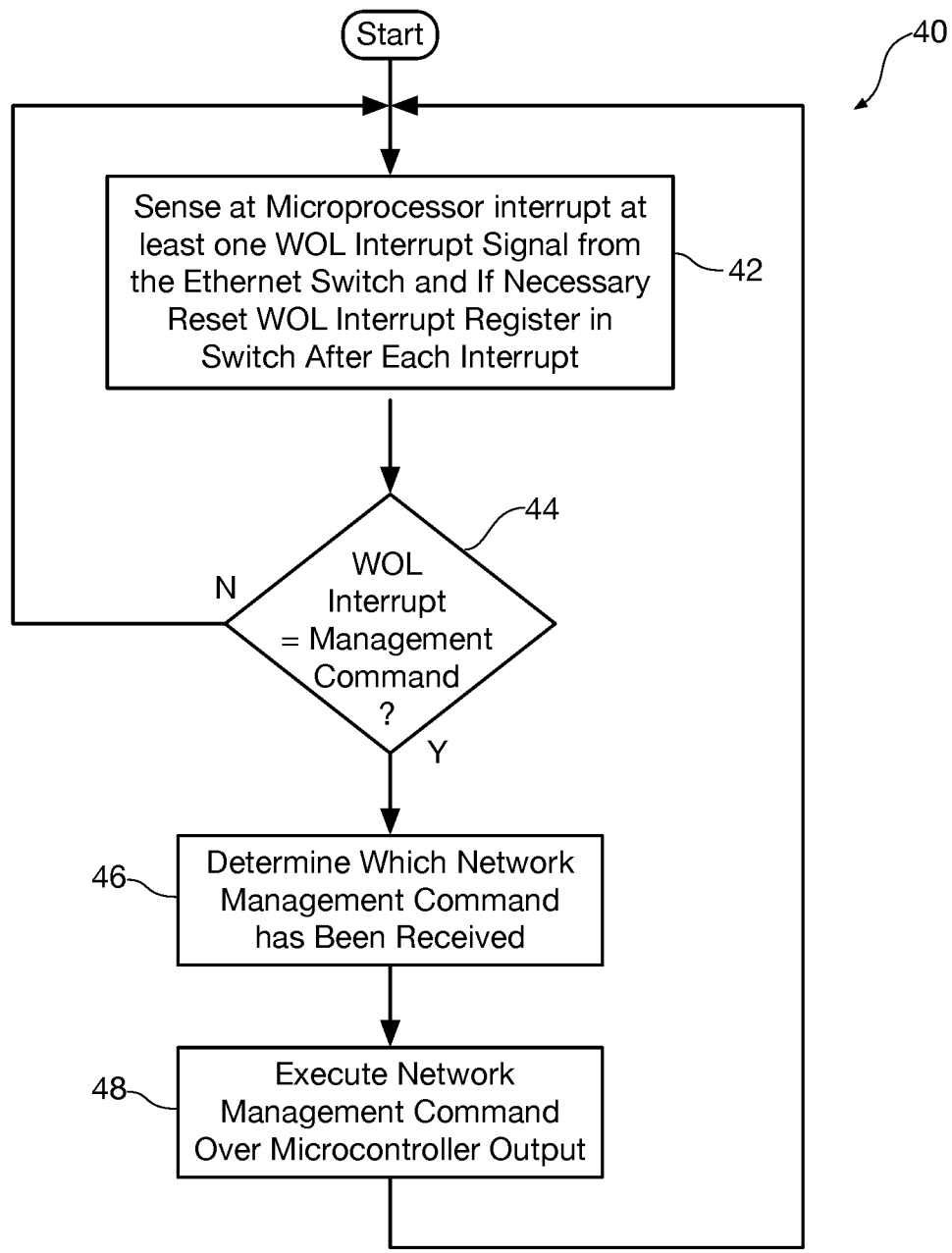
FIG. 3A is a flow diagram showing an illustrative method for processing WOL packets in accordance with an aspect of the present invention.

Referring now to FIG. 3A, a flow diagram shows an illustrative method 40 for implementing network management control in accordance with an aspect of the present invention. At reference numeral 42 the processor senses at least one WOL interrupt signal sent from the Ethernet switch. At reference numeral 44 the processor analyzes the at least one WOL interrupt signal and determines if it (they) represent a management command If the WOL interrupt signals do not represent a management command the process returns to reference numeral 42.

If the processor determines at reference numeral 44 that the at least one WOL interrupt signal represents a management command the process proceeds to reference numeral 46 where the microcontroller analyzes attributes of the at least one WOL interrupt signal and determines what network management control event is being requested. At reference numeral 48 the microcontroller 16 executes the network management request by sending a command to another one of its outputs.

Figure 3B:
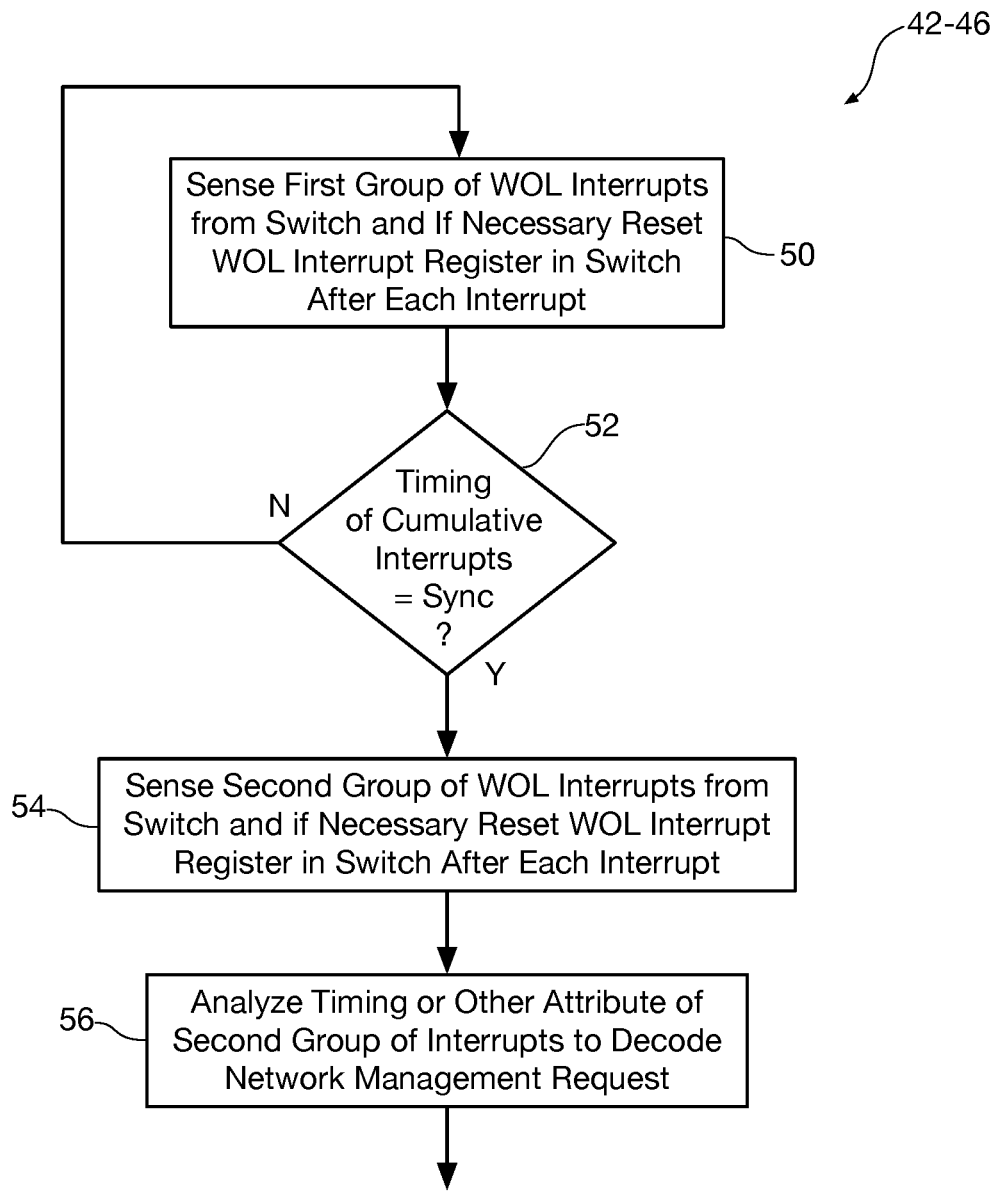
FIG. 3B is a flow diagram showing in more detail a portion of the illustrative method of FIG. 3A for processing WOL packets from the example of FIG. 2 in accordance with an aspect of the present invention.

Referring now to FIG. 3B, a flow diagram shows in more detail the portion of the illustrative method of FIG. 3A shown at reference numerals 42 and 44 for processing WOL packets using the example of FIG. 2 in accordance with an aspect of the present invention. At reference numeral 50 a first group of one or more WOL packets are received in the Ethernet switch, or PHY, and each generate a WOL interrupt signal that is then reset. Those skilled in the art will recognize that resetting the WOL interrupt signal may not be required in all embodiments, since the Ethernet switch, or PHY, may be arranged to self reset after a predetermined reset interval, the reset interval less than the first or second predetermined intervals, or the WOL interrupt signal may be arranged as a pulse signal, in which case no reset may be required. The WOL interrupt signal(s) are received by the processor 16, which as indicated above is herein illustrated as a microcontroller without limitation. At reference numeral 52 the microcontroller analyzes the timing of the arrival of the first group of WOL interrupt signals and determines if they represent a synchronization event that indicates a network control event request will be received. If the timing of receipt of the WOL interrupt signals does not represent a synchronization event the process returns to reference numeral 50.

If the timing of receipt of the WOL interrupt signal(s), representative of the timing of the WOL packets, represents a synchronization event, the method proceeds to reference numeral 54 where a second group of WOL packets are received in the Ethernet switch, or PHY, and each generate a WOL interrupt signal that is then reset if necessary. The interrupt signals are received by the microcontroller. At reference numeral 56 the microcontroller analyzes the timing of the arrival of, or other attribute of the second group of WOL interrupt signals, and determines what network management control event is being requested. The method then proceeds to reference numeral 48 of FIG. 3A where the microcontroller 16 executes the network management request by sending a command to another one of its outputs.

At reference numeral 52 the microcontroller 16 executes the network management request by sending a command to another one of its outputs.

The above example shown in FIG. 3B has been illustrated with a first group of one or more WOL packets used as SYNC packets, followed by a second group of WOL packets, sent at intervals, where the specific message is defined by the intervals between WOL packets of the second group, however this is not meant to be limiting in any way. In another embodiment, SYNC packets are not used, the intervals between successive WOL packets are utilized exclusively. In yet another embodiment, the number of WOL packets sent within a predetermined interval define the specific message being sent, which optionally may be utilized with SYNC packets. In yet another embodiment in response to receipt of a first WOL interrupt signal microcontroller 16 performs a first action, and in response to receipt of a second WOL interrupt signal microcontroller 16 performs a second action, different from the first action. Attributes of the WOL interrupt signals can take numerous forms other than the timing attribute shown with reference to FIG. 2. A non-exhaustive list of other attributes includes the number of WOL packets sent, individual time intervals between different ones of successive WOL packets, and different total numbers of sync packets sent. Other attributes will easily suggest themselves to persons of ordinary skill in the art.

Figure 4:
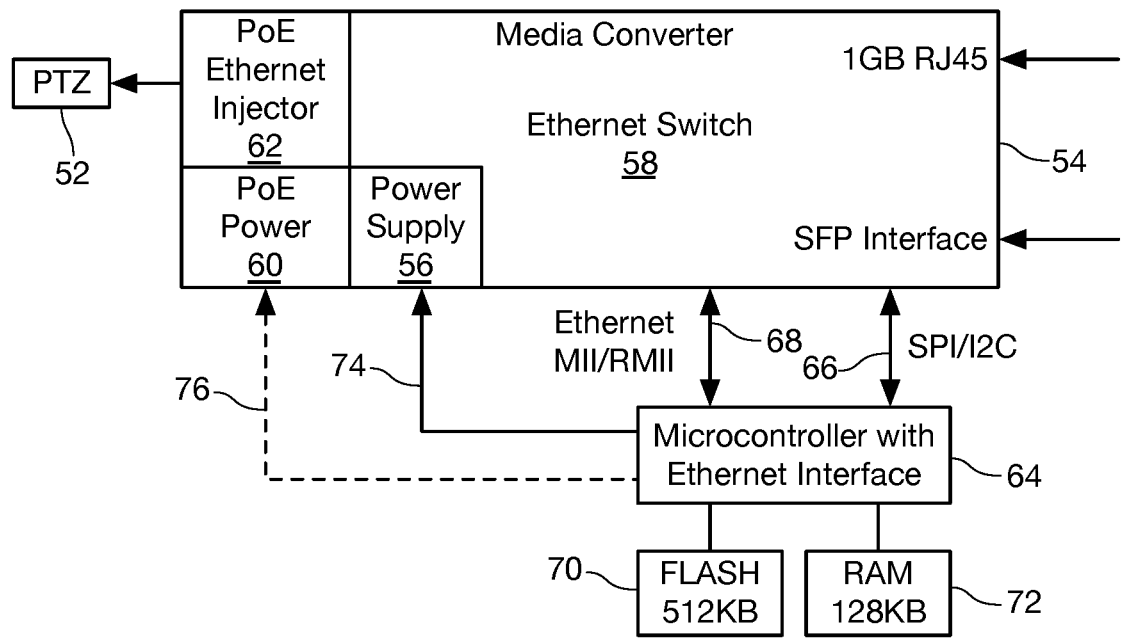
FIG. 4 is a block diagram showing a typical prior-art implementation of a managed PoE injector.

Referring now to FIG. 4, a block diagram shows a typical prior-art implementation of a managed PoE injector for a PTZ Ethernet camera 52. The PoE injector includes a media converter 54 with PoE functionality, such as the PD-9501G-SFP available from Microsemi Corporation. The media converter includes a power supply 56 to supply power to the media converter 54, an Ethernet switch 58, a PoE power supply 60 to supply PoE power to the PTZ Ethernet camera 52, and a PoE Ethernet injector 62 that couples the video output data from the camera 52 to the Ethernet switch 58 and supplies the PoE power that the camera needs to operate. The managed PoE injector coupled to the camera 52 is low in cost and does not have an internal management section due to pressure to keep the overall the price down.

The media converter 54 is coupled to a processor 64 through an SPI/I$^2$C connection 66 and an Ethernet MII/RMII connection 68. The processor 64 requires an internal Ethernet MAC unit and requires FLASH memory 70 (usually 512 KB) and RAM (usually 128 KB) 72. The processor 64 is coupled to the media converter 54 at line 74 to control the power supply 56 that provides a power source to PoE power supply 60 to enable and disable providing power to the PoE power supply 60. Alternatively, processor 64 may have an output directly coupled to enable and disable PoE power supply 60 (shown in dashed line 76).

As indicated above, the cost of the above mentioned managed PoE injector depicted in FIG. 4 can be dramatically reduced if a microcontroller without a MII interface and having only interfaces such as SPI/I$^2$C could be employed to perform the very basic management job without having the need to provide an Ethernet TCP/IP software stack inside the FLASH memory 70 and RAM memory 72. To achieve such a low-cost network management capability, it is advantageous to shift the detection and processing of network management packets from the processor to the Ethernet switch, thus allowing the use of a low-cost microcontroller. Ethernet switches provided with an address, such as a MAC address, as well as the aforementioned WOL packet detection features are advantageously employed in the present embodiments.

Figure 5:
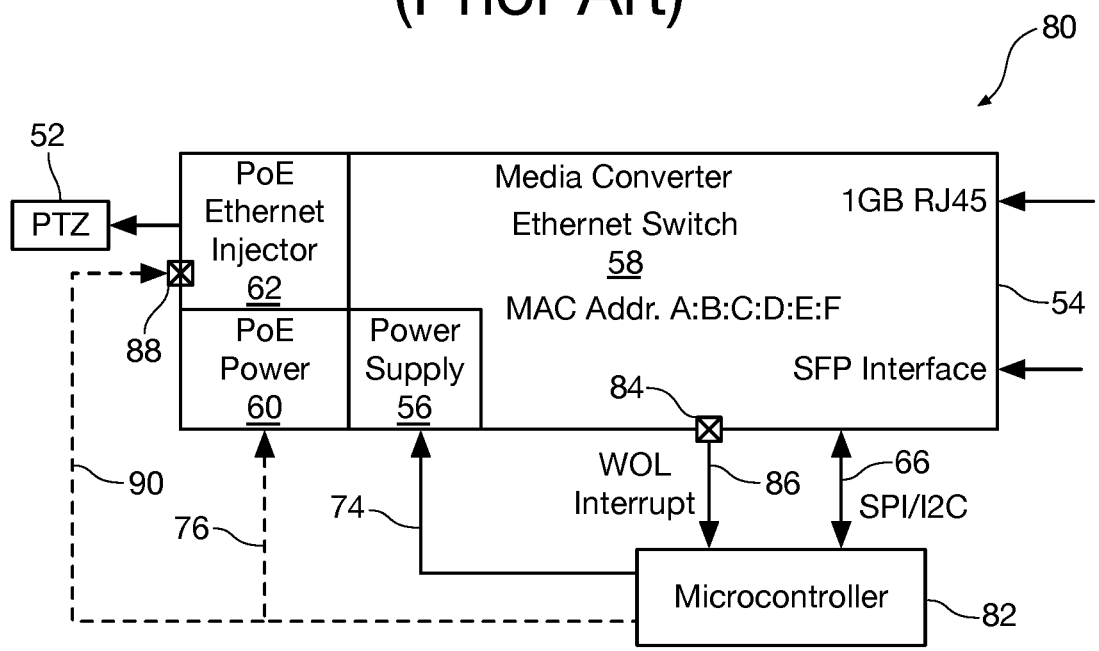
FIG. 5 is a block diagram showing an example of the present invention in the form of a managed PoE injector in accordance with one aspect of the present invention.

Referring now to FIG. 5, a block diagram shows a managed PoE injector 80 in accordance with one aspect of the present invention. Some of the elements in FIG. 5 are the same as corresponding elements in FIG. 4 and will be referred to in FIG. 5 using the same reference numerals used in FIG. 4.

The PoE injector 80 includes a media converter 54 with PoE functionality, such as the PD-9501G-SFP available from Microsemi Corporation. The media converter includes a power supply 56 to supply power to the media converter 54, an Ethernet switch 58, a PoE power supply 60 to supply PoE power to the PTZ Ethernet camera 52, and a PoE Ethernet injector 62 that couples the video output data from the camera 52 to the Ethernet switch 58 and supplies the PoE power that the camera needs to operate. The managed PoE injector coupled to the camera 52 is low in cost and does not have an internal management section due to pressure to keep the overall the price down.

The media converter 54 is coupled to a processor 82 through an SPI/I$^2$C connection 66. Ethernet switch 58 supports a Wake On LAN (WOL) functionality. When a WOL packet is received at the Ethernet switch 58, the Ethernet switch 58 will either signal this event by asserting a signal on a dedicated pin 84 (in the case of Microchip KSZ9897S Ethernet Switch, setting the output to a low logic level) and indicating this event in one of its switch registers. In some other Ethernet switches that may be utilized the pin being used to signal a WOL event is a more general Interrupt pin, which will act after configuration by an associated microcontroller 82, performing instructions stored in a memory thereon, to similarly assert the general Interrupt pin responsive to a received WOL packet, and indicate receipt of the WOL packet as the source of the interrupt in one of its registers. In another embodiment, Ethernet switch 58 does not assert an interrupt signal responsive to receipt of a WOL packet, but rather stores an indication of receipt of the WOL packet on a register of Ethernet switch 58, and microcontroller 82 regularly polls Ethernet switch 58 to determine receipt of the WOL packet by reading the register.

The processor 82 is coupled to the media converter 54 at line 74 that controls the power supply 56 that provides a power source to PoE power supply 60 to enable and disable providing power to the PoE power supply 60. Alternatively, the processor 82 may have an output directly coupled to enable and disable PoE power supply 60 (shown in dashed line 76).

The asserted WOL interrupt signal, when implemented, is communicated to the microcontroller 82 over a WOL interrupt line 86. In such systems, the microcontroller 82 preferably accesses the Ethernet switch 58 registers over an SPI connection, or I$^2$C bus, 66 in order to clear the WOL event if necessary. Part of the WOL packet format includes a 48-bit (6 byte) MAC address identifying the Ethernet switch 58 (shown symbolically in FIG. 5 as A:B:C:D:E:F). The MAC address for intercepting a WOL packet over the LAN that is directed to the specific network device, is either wired into the Ethernet switch 58 at the time of its manufacture or is pre-configured into the Ethernet switch by the microcontroller 84.

Microcontroller 82 performs the method described above, and in response to a first predetermined code of one or more WOL interrupt signals, which are responsive to a first predetermined code of one or more WOL packets, controls power supply 56 to disable providing power to the PoE power supply 60, thus removing power from PTZ camera 52. In response to a second predetermined code of one or more WOL interrupt signals, which are responsive to a second predetermined code of one or more WOL packets, controls power supply 56 to enable providing power to the PoE power supply 60, thus powering PTZ camera 52. As indicated above, other predetermined codes may be utilized, with, or without, SYNC packets, to set Ethernet switch 58 to one of various media modes. As indicated above, in some embodiments a first WOL interrupt signal may be used to control disabling the supply of power from PoE power supply 60 and a second WOL interrupt signal may be used to control disabling the supply of power from PoE power supply 60.

Other embodiments of the invention are contemplated where the PoE Ethernet Injector 80 includes a power enable pin 88 that enables or disables power from the PoE Ethernet injector 62 to the PTZ camera 52 or other controllable device. In such embodiments, an output from the microcontroller 82 (shown at dashed line 90) responds to processing of the WOL packets to drive the power enable pin 88 on the PoE Ethernet Injector 62 to enable or disable power from the PoE Ethernet injector 62 to the PTZ camera 52 or other controllable device.

Persons of ordinary skill in the art will appreciate that the system of the present invention allows the use of a simpler and less expensive microcontroller than would otherwise be required to perform the functions described herein.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An architecture for an Ethernet network comprising:
    an Ethernet switch or PHY including an externally-accessible wake-on-LAN indicator responsive to wake on LAN packets received by the Ethernet switch or PHY;
    a processor in communication with the Ethernet switch or PHY, the processor further coupled to receive the externally-accessible wake-on-LAN indicator in the Ethernet switch or PHY, the processor configured to detect and decode a network management command by analyzing attributes of the received externally-accessible wake-on-LAN indicator; and
    a power-over-Ethernet injector coupled to the Ethernet switch or PHY, the power-over-Ethernet injector responsive to the processor to alternately disable and enable power to an output port in response to the decoded network management command,
    wherein the attributes of the externally-accessible wake-on-LAN indicator comprise at least one of a number of successive externally-accessible wake-on-LAN indicators or groups of externally-accessible wake-on-LAN indicators, and a timing between successive externally-accessible wake-on-LAN indicators or groups of externally-accessible wake-on-LAN indicators.

2. The architecture of claim 1 wherein the externally-accessible wake-on-LAN indicator in the Ethernet switch or PHY is an external output pin on the Ethernet switch or PHY.

3. The architecture of claim 1 wherein the externally-accessible wake-on-LAN indicator in the Ethernet switch or PHY is a register internal to the Ethernet switch or PHY accessible to the communication of the processor.

4. The architecture of claim 1 further comprising a power-over-Ethernet power supply coupled to the power-over-Ethernet injector and to the processor, the power-over-Ethernet power supply to alternately provide power to the power-over-Ethernet injector and to not provide power to the power-over-Ethernet injector responsive to input from the processor regarding the decoded network management command to thereby alternately disable and enable power to the output port in response to the decoded network management command.

5. The architecture of claim 1 wherein a power-enable input on the power-over-Ethernet injector enables and disables a source of power in response to power-on and power-off commands from the processor to thereby alternately disable and enable power to the output port in response to the decoded network management command.

6. The architecture of claim 1 wherein the processor is operable to alternately disable and enable power to the output port when the attributes of the externally-accessible wake-on-LAN indicator comprise a successive number of externally-accessible wake-on-LAN indicators.

7. The architecture of claim 1 wherein the processor is operable to alternately disable and enable power to the output port when the attributes of the externally-accessible wake-on-LAN indicator comprise at least one of a number of successive externally-accessible wake-on-LAN indicators or groups of externally-accessible wake-on-LAN indicators and a timing between successive externally-accessible wake-on-LAN indicators or groups of externally-accessible wake-on-LAN indicators.

8. The architecture of claim 1 wherein the processor is configured to alternately disable and enable power to the output port when attributes of the externally-accessible wake-on-LAN indicators comprise a fixed time interval between the successive externally-accessible wake-on-LAN indicators.

9. An architecture for an Ethernet network comprising:
    an Ethernet switch or PHY including an externally-accessible wake-on-LAN indicator responsive to a wake on LAN packet received by the Ethernet switch or PHY;
    a processor in communication with the Ethernet switch or PHY, the processor further coupled to receive the externally-accessible wake-on-LAN indicator in the Ethernet switch or PHY, the processor configured to detect and decode a network management command by analyzing attributes of successive externally-accessible wake-on-LAN indicators and configured to generate power-on and power-off commands when the attributes of the successive externally-accessible wake-on-LAN indicators comprise at least one of a number of successive externally-accessible wake-on-LAN indicators or a number of groups of successive externally-accessible wake-on-LAN indicators, and a predetermined timing between successive externally-accessible wake-on-LAN indicators or groups of successive externally-accessible wake-on-LAN indicators.

10. The architecture of claim 9 further comprising:
    a power-over-Ethernet injector coupled to the Ethernet switch or PHY, the power-over-Ethernet injector responsive to the power-on and power-off commands to alternately disable and enable power to an output port.

11. The architecture of claim 10 further comprising a power-over-Ethernet power supply coupled to the power-over-Ethernet injector and to the processor, the power-over-Ethernet power supply to alternately provide power to the power-over-Ethernet injector and to not provide power to the power-over-Ethernet injector responsive to the generated power-on and power-off commands.

12. The architecture of claim 9 wherein the processor is configured to generate the power-on and power-off commands when the attributes of the successive externally-accessible wake-on-LAN indicators comprise a fixed time interval between the sending of successive externally-accessible wake-on-LAN indicators.

13. The architecture of claim 9 wherein the processor is configured to generate the power-on and power-off commands when the attributes of the successive externally-accessible wake-on-LAN indicators comprise a predetermined number of successive externally-accessible wake-on-LAN indicators.

14. The architecture of claim 9 wherein the attributes of the successive externally-accessible wake-on-LAN indicators comprise a first number of successive externally-accessible wake-on-LAN indicators having a predetermined relationship to one another, followed by a second number of successive externally-accessible wake-on-LAN indicators, predetermined relationships between the second number of successive externally-accessible wake-on-LAN indicators defining the generation of the power-on command and the power-off command.

15. The architecture of claim 14,
wherein the predetermined relationships between the first number of successive externally-accessible wake-on-LAN indicators comprises a first fixed time interval between the sending of each of the first number of successive externally-accessible wake-on-LAN indicators; and wherein the predetermined relationships between the second number of successive externally-accessible wake-on-LAN indicators comprises a second fixed time interval between the second number of successive externally-accessible wake-on-LAN indicators.

16. The architecture of claim 14 wherein:
a first fixed time interval between each of the second number of successive externally-accessible wake-on-LAN indicators defines one of the power on and the power off command; and
a second fixed time interval between each of the second number of successive externally-accessible wake-on-LAN indicators defines the other of the power on and the power off command.

* * * * *